Figure 1:
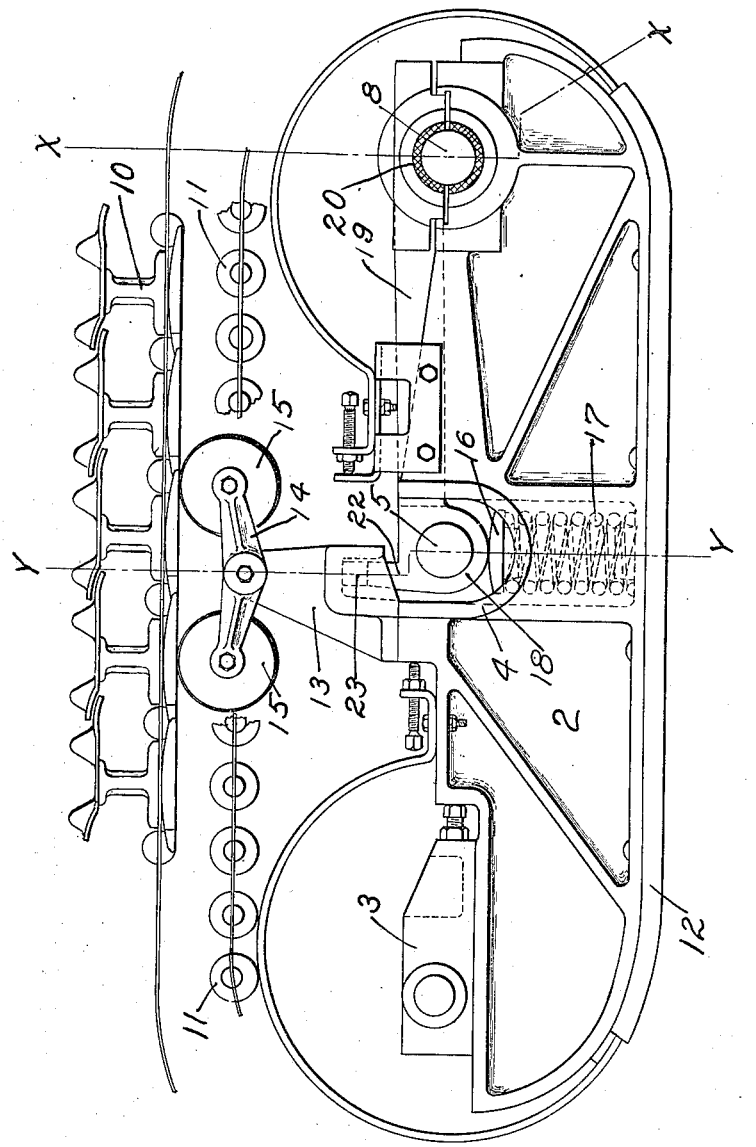

C. L. TOLLES.
TRACTION MACHINE.
APPLICATION FILED NOV. 1, 1912.

1,106,595.

Patented Aug. 11, 1914.
3 SHEETS—SHEET 1.

WITNESSES
H. E. Lambert.
D. E. Sorensen

INVENTOR
CHARLES L. TOLLES
BY Paul & Paul
ATTORNEYS.

C. L. TOLLES.
TRACTION MACHINE.
APPLICATION FILED NOV. 1, 1912.
1,106,595.
Patented Aug. 11, 1914.
3 SHEETS—SHEET 2.
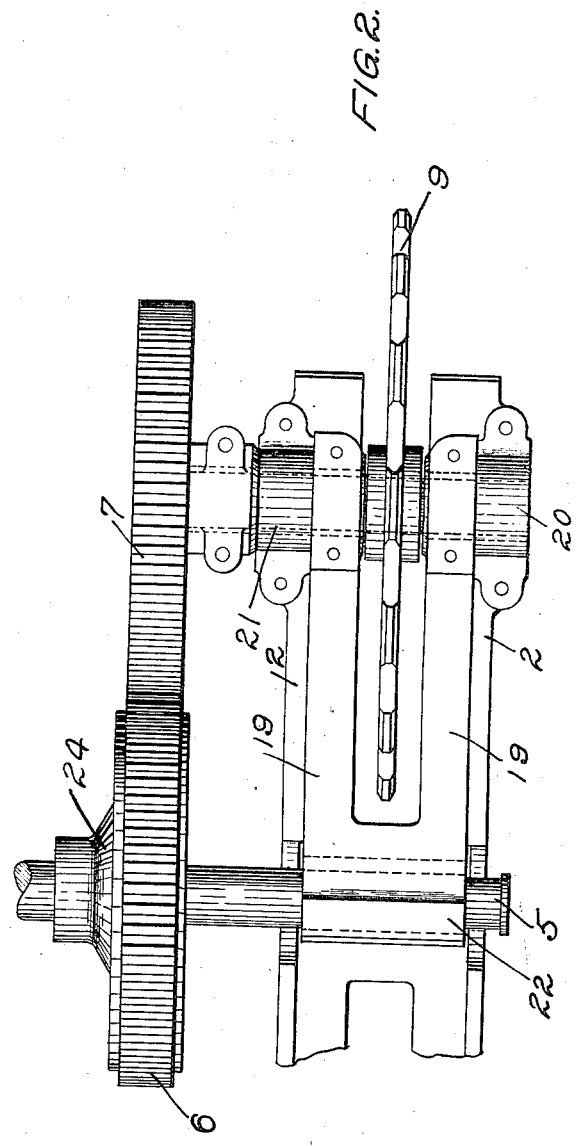
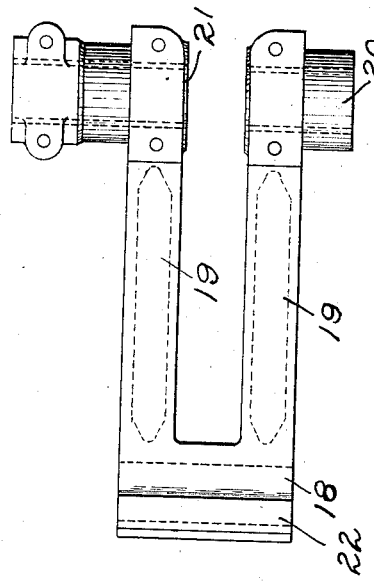
WITNESSES
INVENTOR
CHARLES L. TOLLES.
BY
ATTORNEYS.

C. L. TOLLES.
TRACTION MACHINE.
APPLICATION FILED NOV. 1, 1912.
1,106,595.
Patented Aug. 11, 1914.
3 SHEETS—SHEET 3
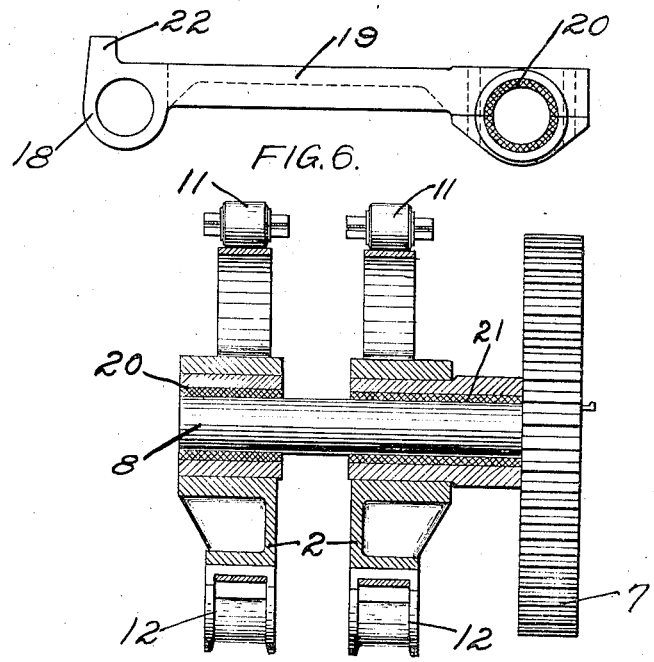
FIG. 6.
FIG. 4.
Sec. X-X.
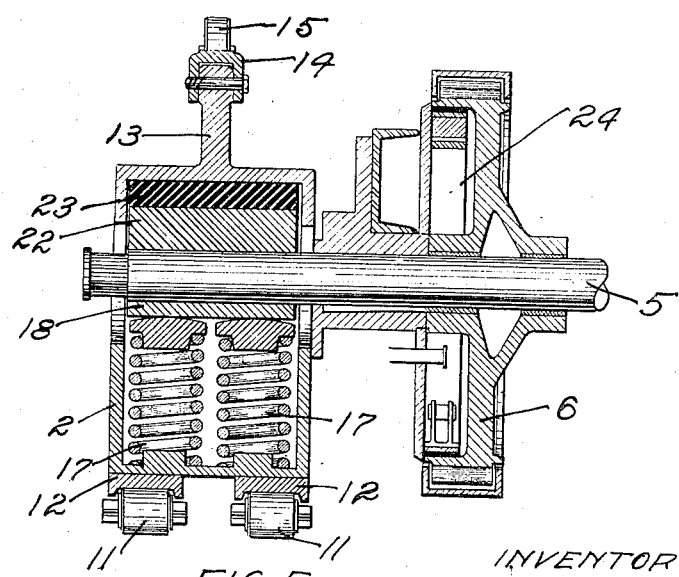
FIG. 5.
Sec. Y-Y.
WITNESSES
H. E. Lambert.
G. E. Sorensen
INVENTOR
CHARLES L. TOLLES
BY Paul & Paul
ATTORNEYS

UNITED STATES PATENT OFFICE.

CHARLES L. TOLLES, OF EAU CLAIRE, WISCONSIN.

TRACTION-MACHINE.

1,106,595. Specification of Letters Patent. Patented Aug. 11, 1914.

Application filed November 1, 1912. Serial No. 729,116.

*To all whom it may concern:*

Be it known that I, CHARLES L. TOLLES, a citizen of the United States, and resident of Eau Claire, in the county of Eau Claire, State of Wisconsin, have invented certain new and useful Improvements in Traction-Machines, of which the following is a specification.

My invention relates to traction machines using a traction belt, and the object of the invention is to provide a yielding bearing between the belt frame and the driving shaft and at the same time maintain a proper mesh between the teeth of the driving and driven gears, regardless of the character of the ground over which the belt and frame may be moving. In machines of this type as usually constructed, if a yielding bearing should be provided between the belt frame and the driving shaft, the tilting of the frame in moving over rough ground would change the relative position of the driving and driven shafts to such an extent that the gears might be partially or wholly out of mesh with one another, thus interfering seriously with the operation of the machine.

My invention consists, therefore, in interposing a compensating device between the driving and driven shafts which will accommodate itself to the tilting of the frame and will maintain a uniform mesh between the driving and driven gears.

In the accompanying drawings forming part of this specification, Figure 1 is a side view of a traction belt frame showing the driving mechanism therefor, certain of the parts being broken away and omitted for the sake of clearness, Fig. 2 is a plan view of the driving and driven gears and the bearings therefor, Fig. 3 is a plan view of the yoke in which the driving shaft and the shaft of the driven sprocket wheel are mounted, Fig. 4 is a sectional view on the line $x$—$x$ of Fig. 1, Fig. 5 is a sectional view on the line $y$—$y$ of Fig. 1, Fig. 6 is a detail edge view of the bearing yoke.

In the drawing, 2 represents a frame, having a block 3 at one end in which the shaft of one of the driven shafts is journaled.

4 represents a box at the middle of the frame, adapted to receive the driving shaft 5, on which is mounted a driving gear 6. This gear meshes with a similar gear 7 upon a shaft 8 on which a sprocket wheel 9 is secured. A belt 10 engages the teeth of the sprocket wheel and has a bearing on the underside of the frame upon a belt provided with antifriction rollers 11 which are adapted to run in a guide-way 12 provided on the underside of the frame. A bracket 13 is bolted to the middle portion of the frame and carries a pivoted arm 14 on which wheels 15 are mounted. These wheels are adapted to contact with the underside of the belt 10 in the operation of the machine and support it in a horizontal position as it travels along over the middle portion of the frame.

Beneath the driving shaft in the box 14 plates 16 are provided, resting upon coiled springs 17 which are adapted to yield under pressure from above or below and are preferably seated in the bottom of the box 4.

To maintain the gears 6 and 7 in their proper relative position and prevent binding or cramping of the teeth in the tilting of the tractor frame, I provide a compensating device consisting of a forked yoke having a bearing 18 at one end that is journaled on the driving shaft and seated on the plate 16. The arms 19 of the fork have bearings 20 and 21 at their ends on the driven shaft 8 and are free to rock on said shaft with the vertical movement of the driving shaft. The yoke is preferably provided above the bearing 13 with a web or projection 22 and is adapted to contact with a block of rubber or other suitable material mounted in a recess in the bracket 13. The inner end of the yoke is thus yieldingly held between the springs 17 and the block 23 and yieldingly resists the up and down movement of the driving shaft.

In the operation of the device, assuming that the frame strikes an obstruction and is forced upwardly thereby, the springs will yield and allow the frame to rise and fall without throwing the gears out of coöperation with one another. This will be due to the fact that the yoke will compensate for the difference in the position of the gears, the yoke swinging on its bearings and accommodating itself automatically to the tilting of the belt frame.

In connection with the driving shaft I prefer to provide a clutch device 24 by means of which the application of power thereto may be controlled.

I claim as my invention:—

1. The combination, with a frame and a traction belt therefor, of a yieldingly supported driving shaft, a gear thereon, a driven shaft, a gear thereon meshing with said driving shaft gear, and a yoke having a bearing at one end for said driven shaft and journaled at its other end on said driving shaft.

2. A traction machine comprising a frame, a traction belt therefor, a driving shaft, a gear thereon, a yoke in which said driving shaft is journaled, means yieldingly resisting vertical movement of said yoke, a driven shaft journaled in said yoke, and a gear mounted on said driven shaft and meshing with said driving shaft gear.

3. The combination, with a frame and a yoke, of a driven shaft journaled in one end of said yoke, a driving shaft whereon the other end of said yoke is mounted, means for yieldingly engaging said yoke above and below said driving shaft, and gears meshing with one another on said driven and driving shafts.

4. The combination, with a frame, of a sprocket wheel mounted therein, a traction belt for said wheel, a bracket mounted on said frame, an arm centrally pivoted on said bracket, anti-friction wheels mounted on the ends of said arm and engaging and supporting the upper run of said traction belt, and means for driving said sprocket wheel.

5. The combination, with a frame having a box therein, of a driving shaft fitting within said box, a yoke journaled at one end on said shaft and adapted to swing vertically thereon, plates yieldingly supported in said box beneath said yoke and contacting therewith, and yielding means provided above said yoke and resisting upward movement thereof, and a driven shaft journaled in the other end of said yoke and geared to said driving shaft.

6. The combination, with a traction frame having a box therein, of a driving shaft fitting within said box, a yoke journaled at one end on said shaft, a bearing plate yieldingly supported in said box beneath said yoke, said yoke having an upwardly projecting web thereon, and a bracket mounted on said frame and provided with a yielding bearing for said web, and a driven shaft journaled in said yoke and geared to said driving shaft.

7. The combination, with a traction frame and belt, of a driving shaft having freedom of vertical movement in said frame, a driven shaft geared to said driving shaft and a compensating yoke having bearings for said driving and driven shafts.

8. The combination, with a traction frame and belt, of a driving shaft yieldingly supported in said frame, a driven shaft geared to said driving shaft, a sprocket wheel mounted on said driven shaft and engaging said belt and means compensating for change in the relative position of said shafts and maintaining the proper mesh of the gears between said shafts.

9. The combination, with a traction frame and belt, of a driving shaft yieldingly mounted with respect to said frame, a driven shaft geared to said driving shaft, and a yoke mounted to accommodate itself to the tilting of said frame to compensate for the difference in position of said shaft gears and maintain them in proper mesh with one another.

In witness whereof, I have hereunto set my hand this 24 day of October, 1912.

CHARLES L. TOLLES.

Witnesses:
HERM STOCKHAUSEN, Jr.,
F. C. BARLOW.